March 14, 1950     W. H. YOUNG     2,500,594
SEAT FRICTION HINGE
Filed Nov. 9, 1946
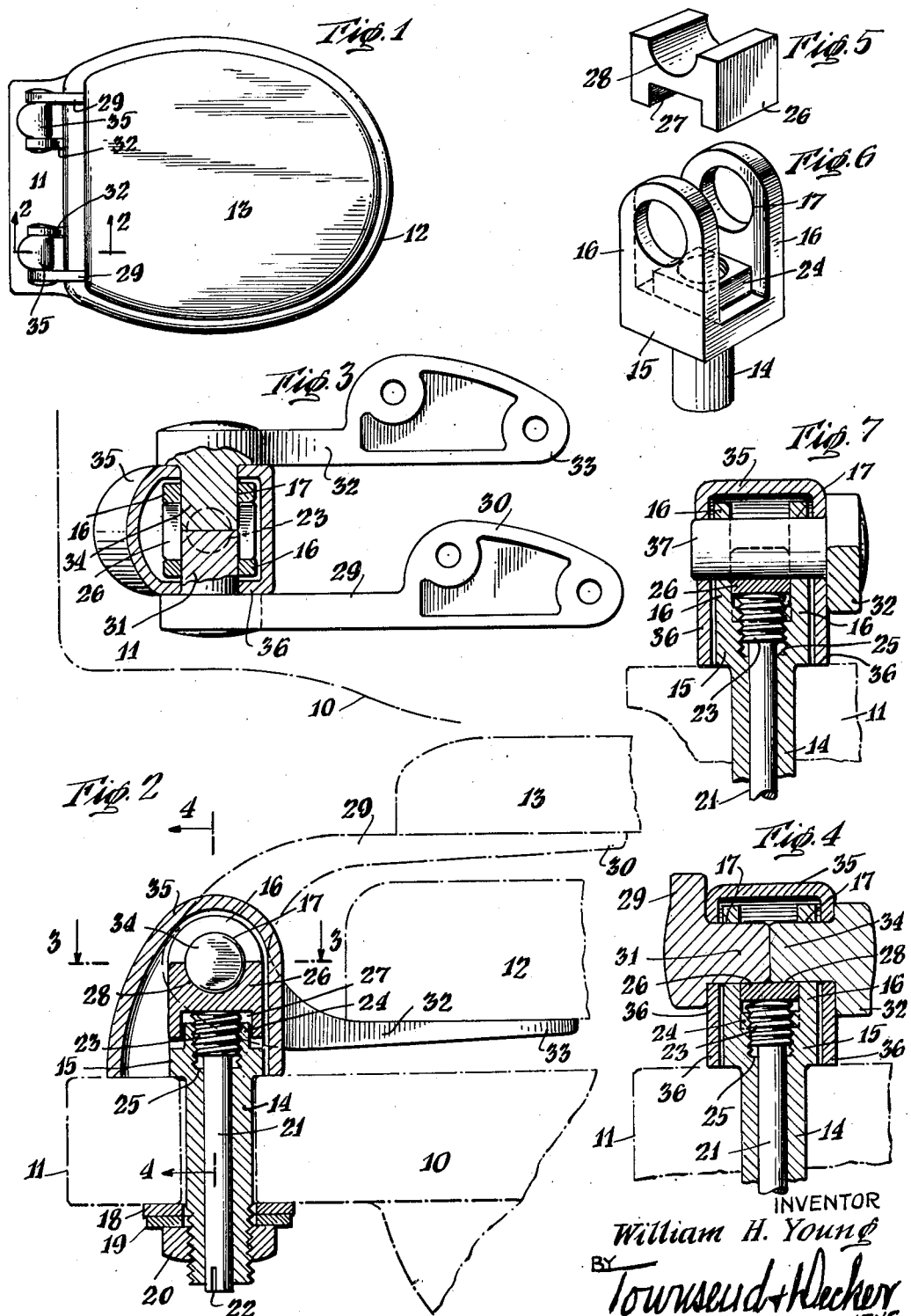

Patented Mar. 14, 1950

2,500,594

UNITED STATES PATENT OFFICE 2,500,594

SEAT FRICTION HINGE

William H. Young, New York, N. Y.

Application November 9, 1946, Serial No. 709,051

8 Claims. (Cl. 4—236)

1

The hinge of the present invention is particularly adapted for use in connection with the attachment of a toilet seat of a water-closet and its cover, or of the toilet seat alone, to the bowl of the water-closet although it could be employed for hingedly connecting any movable part to a fixed part.

The principal object of the invention is the production of a simple and novel form of hinge joint so constructed as to be readily attached to or detached from the parts to which it is applied and which may readily be tightened or loosened when necessity demands.

A further object of the invention is the production of a hinge joint of the character specified in which the inter-connecting parts between the fixed part, as the bowl of a water-closet, and the movable part or parts, as a toilet seat, or a toilet seat and the cover therefor, are hingedly held together by friction only.

Other and further objects and advantages of the invention will appear as the description thereof proceeds, the invention consisting in the novel hinge joint hereinafter more particularly described and then specified in the claims.

In the accompanying drawing in which a practical embodiment of the invention is illustrated:

Fig. 1 is a plan view of the hinge joint or connection as applied to a water-closet seat and its cover.

Fig. 2 is an enlarged horizontal section on the line 2—2 of Fig. 1.

Fig. 3 is a horizontal section on the line 3—3 of Fig. 2.

Fig. 4 is a vertical cross-section on the line 4—4 of Fig. 2.

Fig. 5 is a perspective view of the friction bearing block of the device.

Fig. 6 is a perspective view of that portion of the hinge joint which receives and supports the friction bearing block of Fig. 5.

Fig. 7 is a section taken through a modification of the hinge joint.

Referring in detail to the several figures of the drawing:

The reference numeral 10 indicates a conventional water-closet bowl or other fixed support having the usual rearwardly extending slab or extension 11 provided for the connection thereto of the toilet seat 12 and cover 13 therefor. The slab or extension is provided with spaced openings each adapted to slidably receive a tube or sleeve 14 terminating at its upper end in a horizontally extending flange providing the base 15 of a bearing support having upwardly extending

2 parallel arms 16 provided with horizontally aligned bearing openings 17 therein. Said base 15 acts as a stop to prevent said tube or sleeve 14 from slipping through the opening in the slab 11 previously referred to. For clamping the tube or sleeve in mounted position within the opening, the tube or sleeve is exteriorly screw-threaded at its lower end, as shown, and receives a rubber or other compressible washer 18 and a metal washer 19 as well as a clamping nut 20.

The bore of the tube or sleeve 14 slidably supports a rotatably adjustable rod or spindle 21 which is slotted at its lower end, as at 22, for the reception of a screw-driver or similar tool for rotating the same. The upper end of said rod or spindle is provided with a screw-threaded head 23 which is threaded within a screw-threaded opening in a squared supporting block 24 and a similar screw-threaded aligning opening in the base 15. Said base 15 is forced into tight engagement with the slab or extension 11 by tightening the nut 20 in an obvious manner. The squared supporting block 24 is preferably an integral part of the base 15 and the screw-threaded opening extending through both members and just described is shouldered as indicated at 25 to provide a seat for the reception of the screw-threaded head 23 when the rod or spindle 21 is in lowermost position within the bore of the tube or sleeve 14.

The sides of the squared supporting block 24 engage and interfit with the inner sides of the arms 16 and support them. A movable and removable friction bearing block member is indicated at 26. It is supported by the supporting block 24 and is slotted on the underside thereof as indicated at 27 for reception of said supporting block with which it snugly interfits. It is also provided with a semi-circular bearing groove 28 in its upper face which conforms generally to the configuration of the lower portions of the walls of the opposed bearing openings 17 and which aligns with said openings when the block is mounted on the support 24 intermediate the arms 16.

Outer pivot-carrying brackets are indicated at 29. These brackets are provided with forwardly extending flattened portions 30 engaging and secured to the underside of the seat cover 13, suitable screw-holes being provided therein, as shown for that purpose. The rear end of each of said brackets carries a pivot or pintle 31 which preferably is integral therewith and which extends through an opening 17 in one of the arms 16 of support 15 and is slidably supported by the semi-circular groove 28 in the bearing block member 26. A pair of somewhat similarly constructed but shorter pivot-carrying brackets is indicated at 32 which brackets likewise are provided with flattened portions 33 having screw holes therein for screwing the brackets to the underside of the seat 12. Said brackets are also provided with a pivot or pintle 34, preferably integral therewith, which extends through the opening of the opposite wall 16 of support 15 and is also supported within the groove 28 of bearing block member 26 whereby the ends of said pivots 31 and 34 respectively lie adjacent to and in opposed relation to each other when in supported position within said bearing block as clearly shown in Fig. 4. The seat and cover, accordingly, may be swung into open or closed position as desired and on their respective pivots and each pair of pivots of a set has a common adjustable bearing member therefor.

When it is necessary to tighten or loosen the hinged connection between the seat and cover and the bowl or other support, it is merely necessary to rotate the rod or spindle in the proper direction by means of a suitable screw-driver or the like which raises or lowers the bearing block member 26 as the case may be to increase or decrease the pressure thereof simultaneously against both pivots 31 and 34 and thereby tighten or loosen the frictional engagement of the pivots with the bearing block.

For enhancing the appearance of the hinged connections and to exclude dust and dirt therefrom, each pair of said connections is provided with a hollow, somewhat dome-shaped shield or cover 35 having opposed substantially parallel side walls 36 interposed between the brackets 29 and 32 and the side walls 16 of member 15 and receive the opposed pivots 31 and 34 through suitable openings provided in said side walls 36. The lower free edge of the shield or cover 35 engages the slab or extension 11 of the bowl.

In some cases a hinged connection between the seat and bowl only is required as the cover is eliminated. In cases of that character a single pivot 37 is provided for the bracket 32 which extends through both openings 17 in the arms of bearing member 15 as well as through both side walls of the shield or cover 35 and it is supported by the adjustable bearing block member 26 all as more fully shown in Fig. 7.

The invention claimed is:

1. In a friction hinge, a fixed member and a movable member, a bearing support having a screw-threaded opening therein, means for clamping said bearing support to said fixed member, a rod extending through said fixed member, a screw-threaded head on said rod threaded through said screw-threaded opening, upwardly extending arms on said bearing support provided with aligning openings therein, a movable bearing member carried by said bearing support and adapted for engagement by the head on said rod and a bracket fastened to said movable member and carrying a pivot member entering an opening in one of said arms and engaging said movable bearing member and frictionally and rotatably held between said bearing member and the wall of said opening.

2. In a friction hinge, a fixed member and a movable member, a bearing support having a screw-threaded opening therein, means for clamping said bearing support to said fixed member, a rod extending through said fixed member, a screw-threaded head on said rod threaded through said screw-threaded opening, upwardly extending arms on said bearing support provided with aligning bearing openings therein, a bearing member positioned and slidable intermediate said arms and having a groove therein, said bearing member also interfitting with said bearing support and carried thereby and adapted to be bodily moved by rotation of said rod and a bracket fastened to said movable member and carrying a pivot member entering an opening in one of said arms and engaging within the groove in said bearing member and frictionally held between said bearing member and the wall of said opening.

3. In a friction hinge, a fixed member and a movable member, a bearing support, arms on said bearing support provided with aligning openings therein, means for clamping said bearing support to said fixed member, a rod extending through said fixed member and supported by and rotatably engaging said bearing support, a bearing member slidably mounted on said bearing support and movable by said rod and a bracket fastened to said movable member and provided with a pivot member frictionally engaging the walls of the opening in said arms and said bearing member.

4. In a friction hinge, a fixed member having an opening therein, a movable member, a tube extending through said opening and having a bore therein, a head connected to said tube and comprising a bearing support spanning said opening, arms on said bearing support provided with openings therein, means on said tube for clamping said bearing support against said fixed member, a rod extending through said bore and rotatable therein and connected to said bearing support, a bearing member supported by said bearing support and movable by rotation of said rod and a bracket fastened to said movable member and carrying a pivot frictionally held between the walls of the openings in said arms and said bearing member.

5. In a friction hinge, a fixed member and a movable member, a bearing support, means for clamping said bearing support to said fixed member, a rod extending through said fixed member and engaging said bearing support, upwardly extending arms on said bearing support provided with aligning bearing openings therein, a movable bearing member supported by said bearing support intermediate said arms and adapted to be bodily moved by pressure of said rod thereagainst, a bracket fastened to said movable member and carrying a pivot member entering an opening in one of said arms and frictionally held between said bearing member and the wall of said opening and a hollow shield covering said bearing support and said bearing member and having a free edge engaging said fixed member.

6. In a friction hinge, a fixed member and a movable member, a tube mounted in said fixed member, a bearing support connected to said tube, arms connected to said bearing support and provided with openings therein, means on said tube for clamping said bearing support to said fixed member, a movable bearing member carried by said bearing support, a rod mounted in said tube and engaging and exerting pressure against said movable bearing member and a bracket fastened to said movable member and carrying a pivot member entering the openings in said arms and seated on said movable bearing member and frictionally held between the walls of the openings in said arms and said movable bearing member.

7. In a friction hinge, a fixed member, a movable seat and a movable cover for said seat, a bearing support, means for clamping said bearing support to said fixed member, substantially parallel arms extending upwardly from said bearing support and each provided with a bearing opening therein, a movable bearing member supported on said bearing support intermediate said arms, a bracket fastened to said movable seat and having a pivot entering the bearing opening in one of said arms, a second bracket fastened to said movable cover and having a pivot entering the bearing opening in the other of said arms, said pivots being supported by said movable bearing member with their free ends lying in opposed relation to each other, and means extending through said fixed member and carried by and extending through said bearing support and engaging and exerting pressure against said movable bearing member to force and hold said pivots in engagement with the walls of said bearing openings.

8. In a friction hinge, a fixed member, a movable seat and a movable cover for said seat, a bearing support having aligned bearing openings therein, means for clamping said bearing support to said fixed member, a movable bearing member carried by said bearing support, a bracket fastened to said movable seat and having a pivot entering one of said bearing openings and engaging said bearing member, a second bracket fastened to said movable cover and having a pivot entering the other of said bearing openings and also engaging said bearing member, the free ends of said pivots lying in opposed relation and adjacent to each other, and adjustable means extending through said fixed member and carried by and extending through said bearing support and engaging and exerting pressure against said bearing member to force and hold said pivots in engagement with the walls of said bearing openings.

WILLIAM H. YOUNG.

REFERENCES CITED

The following references are of record in the file of this patent:

UNITED STATES PATENTS

| Number | Name | Date |
|---|---|---|
| 1,956,040 | Meyer | Apr. 24, 1934 |
| 2,050,891 | Maisch | Aug. 11, 1936 |
| 2,083,140 | Brantingson | June 8, 1937 |